United States Patent
Ahn

(10) Patent No.: US 11,307,446 B2
(45) Date of Patent: Apr. 19, 2022

(54) DISPLAY DEVICE HAVING TOUCH SENSOR AND METHOD OF DRIVING SAME

(71) Applicant: LG Display Co., Ltd., Seoul (KR)

(72) Inventor: Seung-Kuk Ahn, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 23 days.

(21) Appl. No.: 16/928,727

(22) Filed: Jul. 14, 2020

(65) Prior Publication Data
US 2021/0072580 A1    Mar. 11, 2021

(30) Foreign Application Priority Data

Sep. 5, 2019 (KR) .......................... 10-2019-0110055

(51) Int. Cl.
*G02F 1/1333* (2006.01)
*G09G 3/36* (2006.01)
*G06F 3/041* (2006.01)

(52) U.S. Cl.
CPC ........ *G02F 1/13338* (2013.01); *G06F 3/0412* (2013.01); *G09G 3/36* (2013.01); *G09G 2330/02* (2013.01)

(58) Field of Classification Search
CPC combination set(s) only.
See application file for complete search history.

(56) References Cited

U.S. PATENT DOCUMENTS

| | | | |
|---|---|---|---|
| 7,505,016 | B2 | 3/2009 | Kwon |
| 10,001,859 | B2 | 6/2018 | Park et al. |
| 2007/0152926 | A1 | 7/2007 | Kwon |
| 2014/0184964 | A1* | 7/2014 | Byeon ............... G02F 1/136286 |
| | | | 349/33 |
| 2017/0192610 | A1 | 7/2017 | Park et al. |
| 2018/0120996 | A1* | 5/2018 | Kang ...................... G06F 3/045 |

FOREIGN PATENT DOCUMENTS

| | | |
|---|---|---|
| KR | 10-2007-0070915 A | 7/2007 |
| KR | 10-2017-0079524 A | 7/2017 |
| KR | 10-2017-0080729 A | 7/2017 |

* cited by examiner

*Primary Examiner* — Robin J Mishler
(74) *Attorney, Agent, or Firm* — Fenwick & West LLP

(57) ABSTRACT

A display device is disclosed that has a touch sensor, which includes a display panel, an integrated driving circuit, a common voltage ring line, and a common voltage feedback line. The integrated driving circuit outputs a touch driving signal and a display common voltage for respectively driving a touchscreen and the display panel. The integrated driving circuit outputs the display common voltage through a common voltage ring pad in a period in which the display panel is driven and outputs a load-free common voltage having a form different from that of the display common voltage through the common voltage ring pad in a period in which the touchscreen is driven.

14 Claims, 13 Drawing Sheets

| Item | Display Period | Touch Period |
|---|---|---|
| Touch Bump | Vcom to Panel | Vcom LFD / TAFE |
| Vcom Ring Bump | Vcom to Panel | Vcom LFD |
| Vcom Feedback Bump | Vcom from Panel | Vcom LFD |

DISPLAY DEVICE HAVING TOUCH SENSOR AND METHOD OF DRIVING SAME

CROSS-REFERENCE TO RELATED APPLICATIONS

This application claims the benefit of Republic of Korea Patent Application No. 10-2019-0110055, filed on Sep. 5, 2019, which is hereby incorporated by reference as if fully set forth herein.

BACKGROUND

Field of Technology

The present disclosure relates to a display device having a touch sensor and a method of driving the same.

Discussion of the Related Art

With the development of information technology, the market for display devices that are connecting media between users and information is expanding. Accordingly, display devices such as an organic light emitting display (OLED), a quantum dot display (QDD), a liquid crystal display (LCD) and a plasma display panel (PDP) are increasingly used.

Some of the aforementioned display devices, for example, an LCD or an OLED include a display panel including a plurality of subpixels arranged in a matrix form, a driver which outputs a driving signal for driving the display panel, and a power supply which generates power to be supplied to the display panel and the driver. The driver includes a scan driver which supplies scan signals (or gate signals) to the display panel and a data driver which supplies data signals to the display panel.

Further, the aforementioned display devices can be implemented as portable information devices such as smartphones, laptop computers, computer monitors, home appliances, etc. In addition, a display device included in such products has a touch sensor (or a touchscreen) as a user input means.

The aforementioned display devices can display an image in such a manner that selected subpixels transmit light or directly emit light when driving signals, for example, a scan signal and a data signal, are supplied to the subpixels formed in the display panel. In addition, user input can be received through touch of a display panel and a hardware or software operation corresponding thereto can be performed.

SUMMARY

An object of the present disclosure for substantially obviating the aforementioned problems is to enhance or improve touch sensitivity in a peripheral part of a display panel and to compensate for voltage ripples on the basis of a feedback common voltage received from the display panel to enhance or improve definition.

To accomplish the object, the present disclosure provides a display device having a touch sensor, which includes a display panel having a touchscreen, an integrated driving circuit, a common voltage ring line, and a common voltage feedback line. The integrated driving circuit outputs a touch driving signal and a display common voltage for respectively driving the touchscreen and the display panel. The common voltage ring line is disposed in the display panel and connected to a common voltage ring pad of the integrated driving circuit. The common voltage feedback line is disposed in the display panel, connected to a common voltage feedback pad of the integrated driving circuit and connected to the common voltage ring line in an area far away from the integrated driving circuit. The integrated driving circuit outputs the display common voltage through the common voltage ring pad in a period in which the display panel is driven and outputs a load-free common voltage having a form different from that of the display common voltage through the common voltage ring pad in a period in which the touchscreen is driven.

The display common voltage may have a DC form and the load-free common voltage may have a pulse form.

The display device may further include a common voltage compensation circuit connected to an input pad of the integrated driving circuit and configured to compensate for the display common voltage to be applied to the display panel on the basis of a feedback common voltage transmitted through the common voltage feedback line.

The integrated driving circuit may receive the feedback common voltage through the common voltage feedback pad in the period in which the display panel is driven and output the load-free common voltage through the common voltage feedback pump in the period in which the touchscreen is driven.

The common voltage ring line may have a disconnected open region while surrounding all sides of the touchscreen positioned on the display panel.

The open region may be positioned in an upper non-display area of the display panel.

The integrated driving circuit may include a first selector for outputting one selected from the display common voltage, the load-free common voltage and the touch driving signal through touch pads connected to the display panel having the touchscreen, a second selector for outputting one selected from the display common voltage and the load-free common voltage through the common voltage ring pad, and a third selector for receiving the feedback common voltage or outputting the load-free common voltage through the common voltage feedback pad.

The first to third selectors may perform selective operations on the basis of a signal defining the period in which the display panel is driven and the period in which the touchscreen is driven.

The present disclosure provides a method of driving a display device having a touch sensor, which includes an integrated driving circuit outputting a touch driving signal and a display common voltage for respectively driving a touchscreen and a display panel, a common voltage ring line disposed in the display panel and connected to a common voltage ring pad of the integrated driving circuit, and a common voltage feedback line disposed in the display panel, connected to a common voltage feedback pad of the integrated driving circuit and connected to the common voltage ring line in an area far away from the integrated driving circuit. The method of driving a display device having a touch sensor includes: a display panel driving step of outputting the display common voltage through the common voltage ring pad in a period in which the display panel is driven; and a touchscreen driving step of outputting a load-free common voltage having a form different from that of the display common voltage through the common voltage ring pad in a period in which the touchscreen is driven.

The display panel driving step may further include a step of receiving a feedback common voltage through the common voltage feedback pad and compensating for the display common voltage to be applied to the display panel on the basis of the feedback common voltage, and the touchscreen driving step further comprises a step of outputting the load-free common voltage through the common voltage feedback pad.

The present disclosure can provide a display device having a touch sensor for enhancing or improving touch sensitivity in a peripheral part of a display panel and compensating for voltage ripples on the basis of a feedback common voltage received from the display panel to enhance or improve definition. Furthermore, the present invention can cope with generation of a pattern vulnerable to voltage ripples (color mixture and horizontal block dimming) on the display panel.

DETAILED DESCRIPTION

Hereinafter, embodiments of the present disclosure will be described with reference to the accompanying drawings.

A display device having a touch sensor according to the present disclosure may be implemented as a TV, a navigation system, a video player, a Blu-ray player, a personal computer (PC), a home theater, a tablet PC, a smartphone (mobile phone), or the like.

Although a display panel such as a liquid crystal display panel, an organic light emitting display panel, an electrophoretic display panel, a quantum dot display panel, or a plasma display panel may be selected as a display device having a touch sensor according to the present disclosure, the present invention is not limited thereto. However, a liquid crystal display will be exemplified below for convenience of description.

Figure 1:
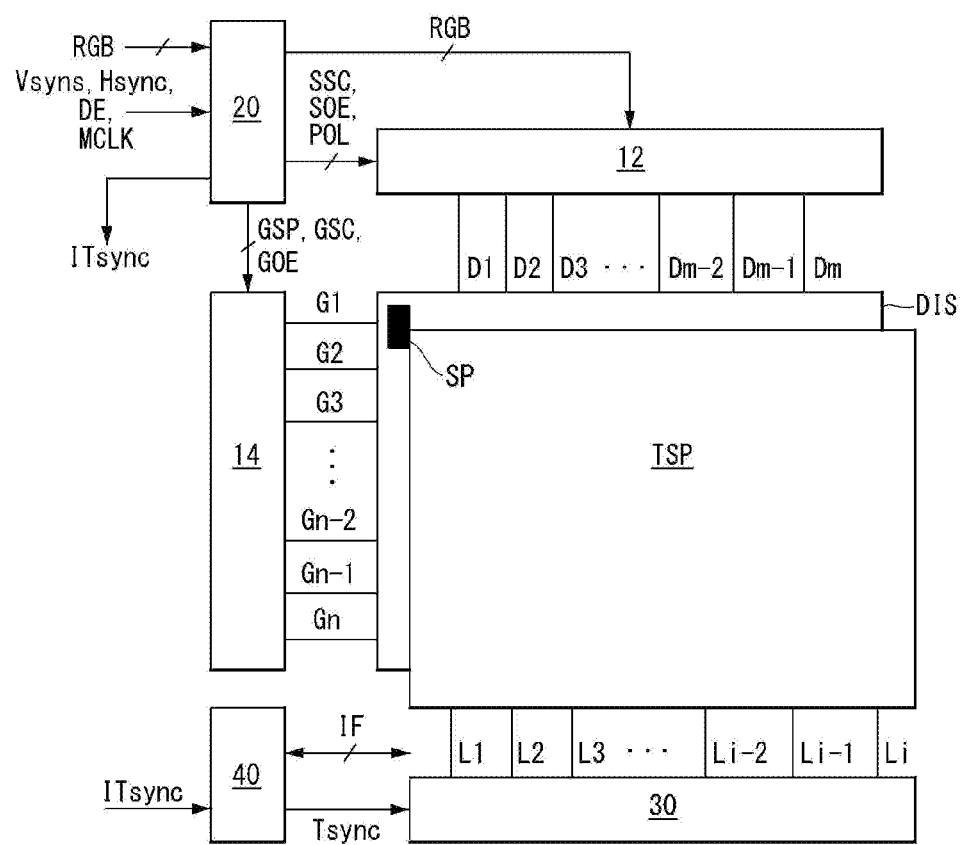
FIG. 1 is a block diagram schematically showing a configuration of a display device having a touch sensor according to one embodiment.
Figure 2:
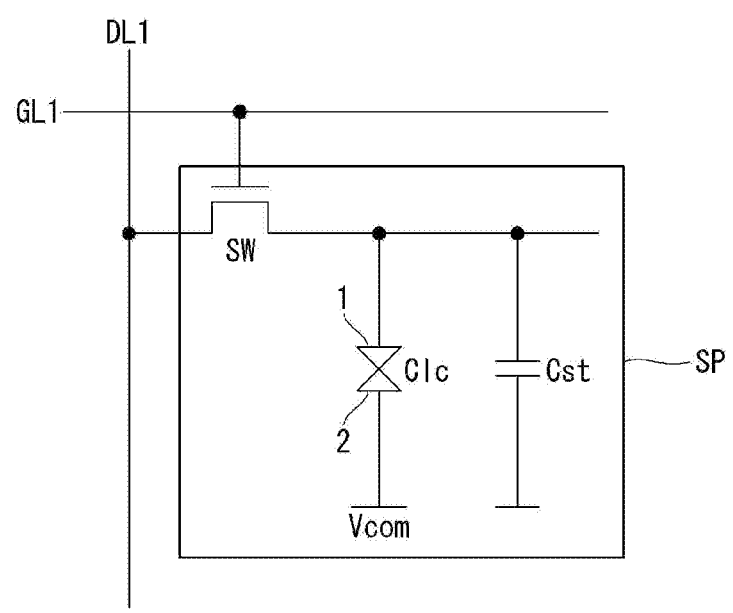
FIG. 2 illustrates a subpixel shown in FIG. 1 according to one embodiment.
Figure 3:
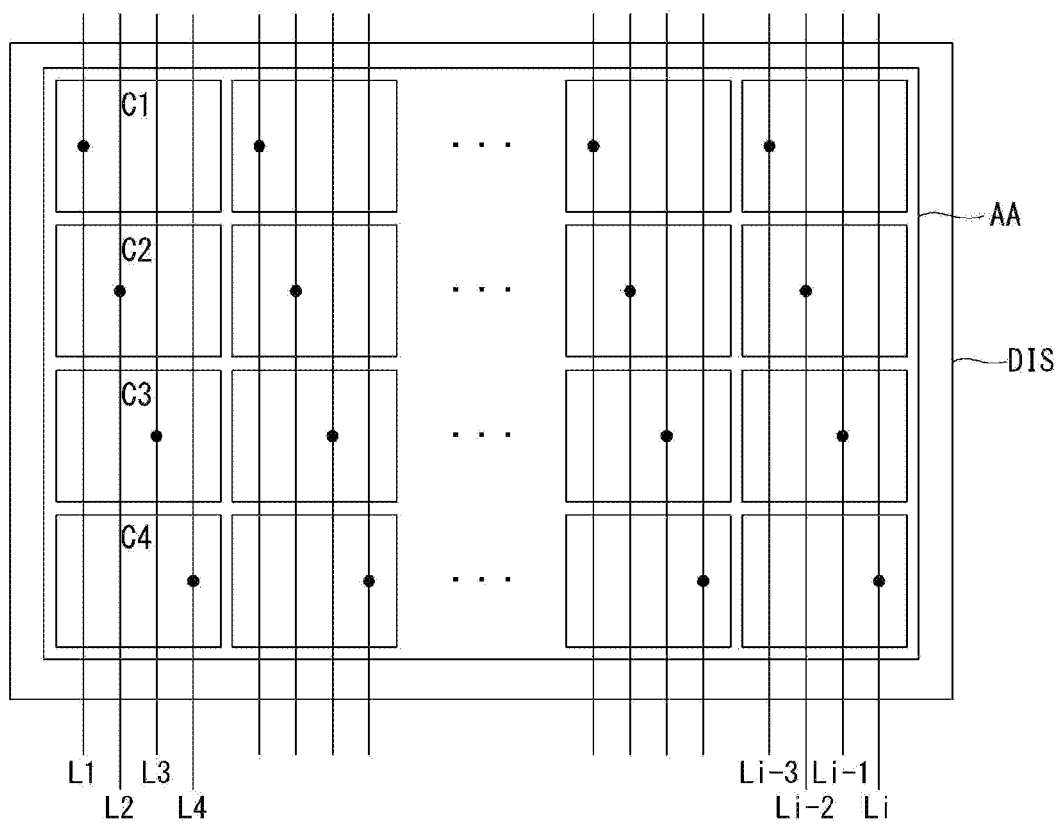
FIG. 3 schematically illustrates a touch sensor of a touchscreen according to one embodiment.
Figure 4:
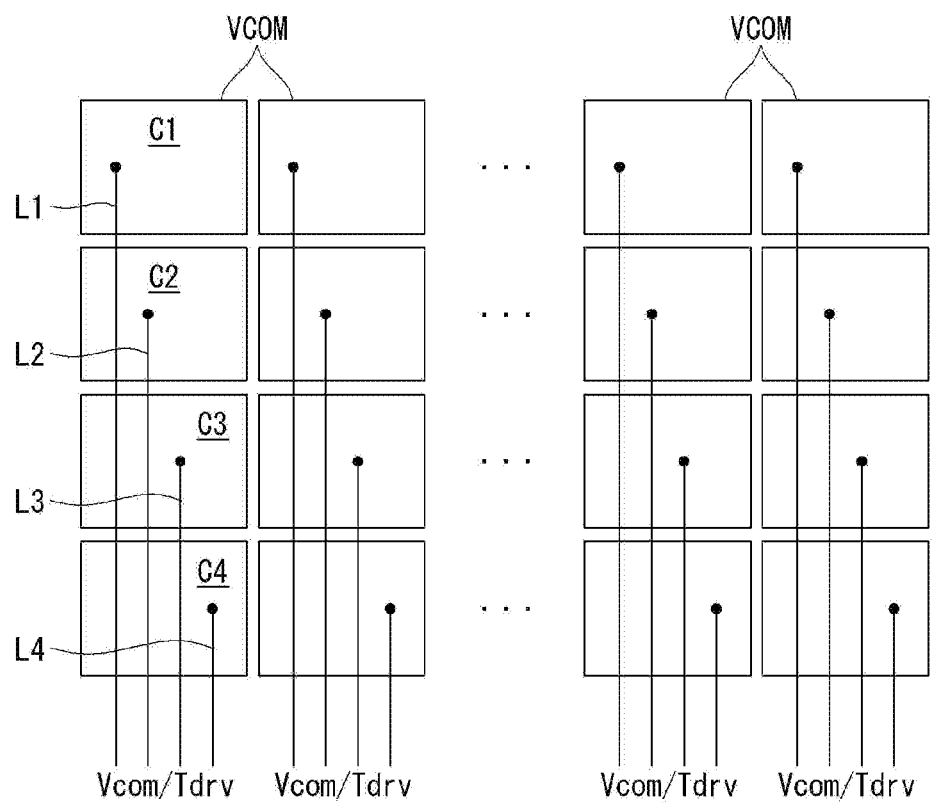
FIG. 4 illustrates a touchscreen composed of common electrodes according to one embodiment.
Figure 5:
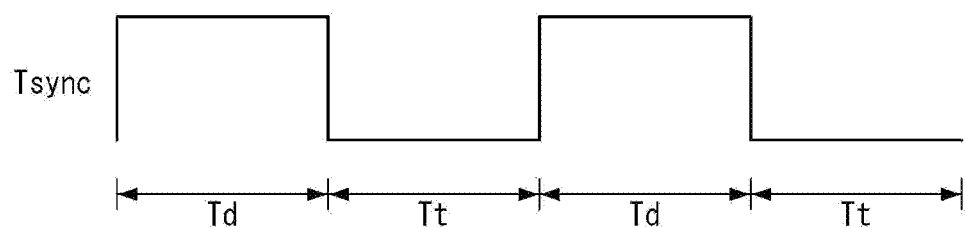
FIG. 5 illustrates a waveform for describing an in-cell touch type time division driving technique according to one embodiment.

FIG. 1 is a block diagram schematically showing a configuration of a display device having a touch sensor, FIG. 2 illustrates a subpixel shown in FIG. 1, FIG. 3 schematically illustrates a touch sensor of a touchscreen, FIG. 4 illustrates a touchscreen composed of common electrodes, and FIG. 5 illustrates a waveform for describing an in-cell touch type time division driving technique.

As shown in FIG. 1, a display device according to an embodiment of the present disclosure includes a timing controller 20, a data driving circuit 12, a scan driving circuit 14, a liquid crystal display panel DIS, a touchscreen TSP, a touchscreen driving circuit 30, and a microcontroller 40.

The timing controller 20 controls the data driving circuit 12 and the scan driving circuit 14. The timing controller 20 receives digital video data RGB along with timing signals such as a vertical synchronization signal Vsync, a horizontal synchronization signal Hsync, a data enable signal DE and a main clock signal MCLK from a host system (not shown).

The timing controller 20 controls the scan driving signal 14 on the basis of scan timing control signals such as a gate start pulse signal GSP, a gate shift clock signal GSC and a gate output enable signal GOE. The timing controller 20 controls the data driving circuit 12 on the basis of data timing control signals such as a source sampling clock signal SCC, a polarity control signal POL and a source output enable signal SOE.

The data driving circuit 12 converts the digital video data RGB input from the timing controller 20 into an analog positive/negative gamma compensation voltage to generate a data voltage. The data driving circuit 12 supplies the data voltage through data lines D1 to Dm.

The scan driving circuit 14 sequentially generates gate signals (or scan pulse signals) synchronized with the data voltage. The scan driving circuit 14 supplies the gate signals through gate lines G1 to Gn. The scan driving circuit 14 outputs a gate high voltage for turning on switching transistors included in subpixels of the liquid crystal display panel DIS and a gate low voltage for turning off the switching transistors as the gate signals.

The liquid crystal display panel DIS displays an image on the basis of the gate pulse signals supplied from the scan driving circuit 14 and the data voltage supplied from the data driving circuit 12. The liquid crystal display panel DIS includes a liquid crystal layer formed between two substrates. The liquid crystal display panel DIS may be implemented in any known liquid crystal mode such as a twisted nematic (TN) mode, a vertical alignment (VA) mode, an in-plane switching (IPS) mode, and a fringe field switching (FFS) mode.

The subpixels of the liquid crystal display panel DIS are defined by the data lines D1 to Dm (m being an integer equal to or greater than 2) and the gate lines G1 to Gn (n being an integer equal to or greater than 2). A single subpixel may include a thin film transistor (TFT) formed at an intersection of a data line and a gate line, a pixel electrode charging a data voltage, and a storage capacitor Cst connected to the pixel electrode to maintain a voltage of a liquid crystal cell. The liquid crystal display panel DIS may include a black matrix and a color filter formed on an upper substrate thereof. The liquid crystal display panel DIS may include TFTs, pixel electrodes and common electrodes formed on a lower substrate thereof. The liquid crystal display panel DIS may be implemented in a color filter on TFT (COT) structure. In this case, the black matrix and the color filter may be formed on the lower substrate of the liquid crystal display panel DIS.

The common electrodes through which a common voltage is supplied may be formed on the upper substrate or the lower substrate of the liquid crystal display panel DIS. A polarizer is attached to the upper substrate and the lower substrate of the liquid crystal display panel DIS and an alignment film for setting a pretilt angle of liquid crystal is formed on the side of the polarizer which comes into contact with the liquid crystal.

The touchscreen driving circuit 30 senses presence or absence of touch and a touch point using the touchscreen TSP. The touchscreen driving circuit 30 includes a driving circuit for generating a driving voltage for driving a touch sensor and a sensing circuit for sensing the touch sensor and generating data for detecting presence or absence of touch and coordinate information. The driving circuit and the sensing circuit of the touchscreen driving circuit 30 may be configured in the form of an integrated circuit (IC) or may be separately configured.

The touchscreen driving circuit 30 is formed on an external substrate connected to the liquid crystal display panel DIS. The touchscreen driving circuit 30 is connected to the touchscreen TSP through sensing lines L1 to Li (i is a positive integer). The touchscreen driving circuit 30 senses presence or absence of touch and a touch point on the basis of a capacitance deviation between touch sensors formed in the touchscreen TSP.

A capacitance deviation is generated between a position touched by a user's finger and a position that is not touched. The touchscreen driving circuit 30 senses presence or absence of touch and a touch point by sensing this capacitance. The touchscreen driving circuit 30 generates touch data with respect to presence or absence of touch and a touch point and transmits the touch data to the microcontroller 40.

The microcontroller 40 controls the touchscreen driving circuit 30. The microcontroller 40 receives a first touch synchronization signal ITsync from the timing controller 20. The microcontroller 40 generates a second touch synchronization signal Tsync for controlling the touchscreen driving circuit 30 on the basis of the first touch synchronization signal ITsync.

The microcontroller 40 exchanges the touch data and other signals with the touchscreen driving circuit 30 on the basis of an interface IF defined therebetween. The microcontroller 40 transmits the touch data to the host system (not shown). Meanwhile, although the microcontroller 40 and the touchscreen driving circuit 30 are illustrated as separate blocks in the above description, they may be implemented as a touchscreen controller 30 and 40 configured in the form of an IC.

Column spacers for maintaining a cell gap of liquid crystal cells are formed between the upper substrate and the lower substrate of the liquid crystal display panel DIS. A backlight unit is disposed under the backside of the lower polarizer of the liquid crystal display panel DIS. The backlight unit is implemented as an edge type, a direct type, or the like and provides light to the liquid crystal display panel DIS.

As shown in FIGS. 1 and 2, a single subpixel SP implemented on the liquid crystal display panel DIS includes a switching transistor SW, a storage capacitor Cst and a liquid crystal layer Clc. A gate electrode of the switching transistor SW is connected to a scan line GL1 and a source electrode is connected to a data line DL1. One end of the storage capacitor Cst is connected to a drain electrode of the switching transistor SW and the other end thereof is connected to a common voltage line Vcom. The liquid crystal layer Clc is formed between a pixel electrode 1 connected to the drain electrode of the switching transistor SW and a common electrode 2 connected to the common voltage line Vcom.

The subpixels SP of the liquid crystal display panel are implemented in the TN mode, VA mode, IPS mode, FFS mode, an electrically controlled birefringence (ECG) mode, or the like according to the structures of the pixel electrode 1 and the common electrode 2.

As shown in FIG. 3, the touchscreen TSP may be included in a display area AA of the liquid crystal display panel DIS such that the touchscreen TSP operates in an in-cell self-touch (abbreviated as self-touch hereinafter) sensing manner. The self-touch sensing type touchscreen TSP uses an electrode configured in the form of a block (or point) of electrodes formed in the liquid crystal display panel DIS as a touch sensor.

C1, C2, C3 and C4 formed in the display area AA of the liquid crystal display panel DIS represent touch sensors (or touch sensor blocks) and L1, L2, L3 and L4 to Li represent sensing lines connected to touch sensors. An example of configuring a touch sensor using a common electrode will be described below.

As shown in FIG. 4, in the self-touch sensing type touchscreen TSP, common electrodes VCOM included in M (M being an integer equal to or greater than 4) subpixels (e.g., 32 horizontal subpixels 32 vertical subpixels) formed in the liquid crystal display panel DIS constitute a single touch sensor. That is, the touch sensors C1, C2, C3 and C4 are defined by common electrodes VCOM separately formed in the liquid crystal display panel DIS.

As shown in FIGS. 1 to 5, a display driving period Td in which an image is displayed on the display device having the self-touch sensing type touchscreen and a touchscreen driving period Tt in which the touchscreen TSP is sensed are separate from each other in time. That is, the display driving period Td and the touchscreen driving period operate in a time division manner.

The touchscreen driving circuit 30 supplies a touch driving signal Tdry through the sensing lines L1 to Li connected to the self-touch sensing type touchscreen TSP. As described above, the touch driving signal Tdry is supplied to the sensing lines L1 to Li for the touchscreen driving period Tt. On the other hand, a common voltage Vcom is supplied to the sensing lines L1 to Li for the display driving period Td. The touch driving signal Tdry may be generated in the form of an AC signal. Time division operation of the display driving period Td and the touchscreen driving period Tt is performed by the touch synchronization signal Tsync.

Figure 6:
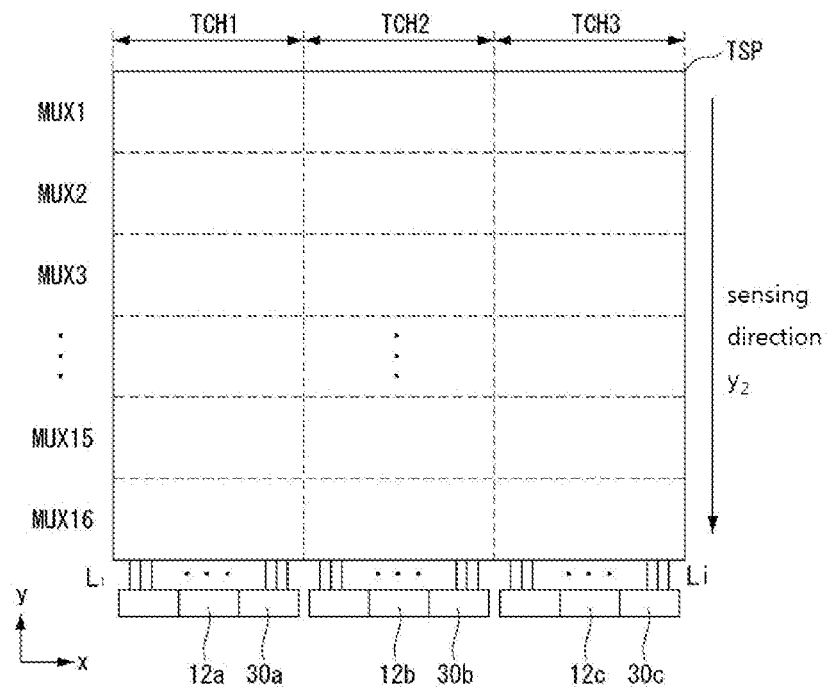
FIG. 6 illustrates a touchscreen for describing the concept of sensing per line in a self-touch sensing method according to one embodiment.
Figure 7:
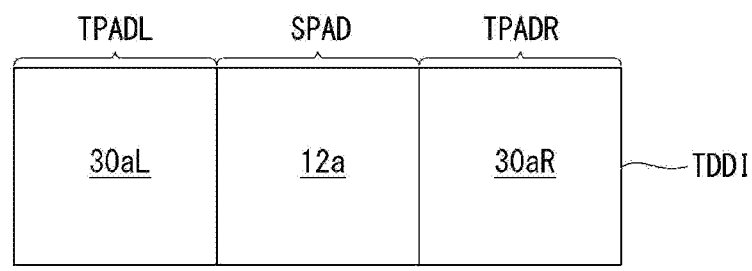
FIG. 7 is a diagram for describing blocks of an integrated driving circuit shown in FIG. 6 according to one embodiment.

FIG. 6 illustrates a touchscreen for describing the concept of sensing per line in a self-touch sensing method and FIG. 7 is a diagram for describing blocks of an integrated driving circuit shown in FIG. 6.

As shown in FIG. 6, driving circuits 12a to 12c and 30a to 30c for driving the liquid crystal display panel and the touchscreen TSP are arranged on one side (lower side) of the touchscreen TSP. A touch sensing area of the touchscreen TSP may be divided into three areas in the vertical direction y (sensing direction). It can be ascertained from the touch sensing areas divided in the vertical direction y that the design may be changed according to a physical range within which the driving circuits can operate.

A first driving circuit 12a and 30a is disposed in the left region to sense a first touch channel TCH1, a second driving circuit 12b and 30b is disposed in the central region to sense a second touch channel TCH2, and a third driving circuit 12c and 30c is disposed in the right region to sense a third touch channel TCH3.

The first to third driving circuits 12a to 12c and 30a to 30c respectively include data driving circuits 12a to 12c and touchscreen driving circuits 30a to 30c. That is, the data driving circuits 12a to 12c and the touchscreen driving circuits 30a to 30c are respectively combined to realize an integrated driving circuit in the form of an IC.

The first to third driving circuits 12a to 12c and 30a to 30c can time-division sense the touchscreen TSP line by line through MUXs provided inside or outside thereof. For example, the sensing area of the touchscreen TSP may be divided into 16 areas in the horizontal direction x. It can be ascertained from the touch sensing areas divided in the horizontal direction x that the design may be changed according to a physical range within which one driving circuit can operate.

The first to third driving circuits 12a to 12c and 30a to 30c can sequentially sense a first MUX line MUX1 to a sixteenth MUX line MUX16 (or an I-th MUX line (I being an integer equal to or greater than 2)) of the touchscreen TSP through the MUXs provided inside or outside thereof. Sensing of the touchscreen TSP may be performed from top to bottom in a direction y2.

As shown in FIG. 7, an integrated driving circuit TDDI includes the data driving circuit 12a (referred to as a source IC or a source) having data pads SPAD connected to data lines of the liquid crystal display panel, and touchscreen driving circuits 30aL and 30aR (referred to as a read-out IC or ROIC) having touch pads TPADL and TPADR connected to sensing lines of the touchscreen. Although a configuration in which the data driving circuit 12a is disposed at the center and the touchscreen driving circuits 30aL and 30aR are disposed on the left and right side of the data driving circuit 12a is exemplified in the shown figure, the present invention is not limited thereto.

Hereinafter, a display device having a touch sensor according to an embodiment of the present invention will be described. A small display device will be used to describe main components of the present disclosure. However, this is for the purpose of convenience of description and the present invention is not limited thereto.

Figure 8:
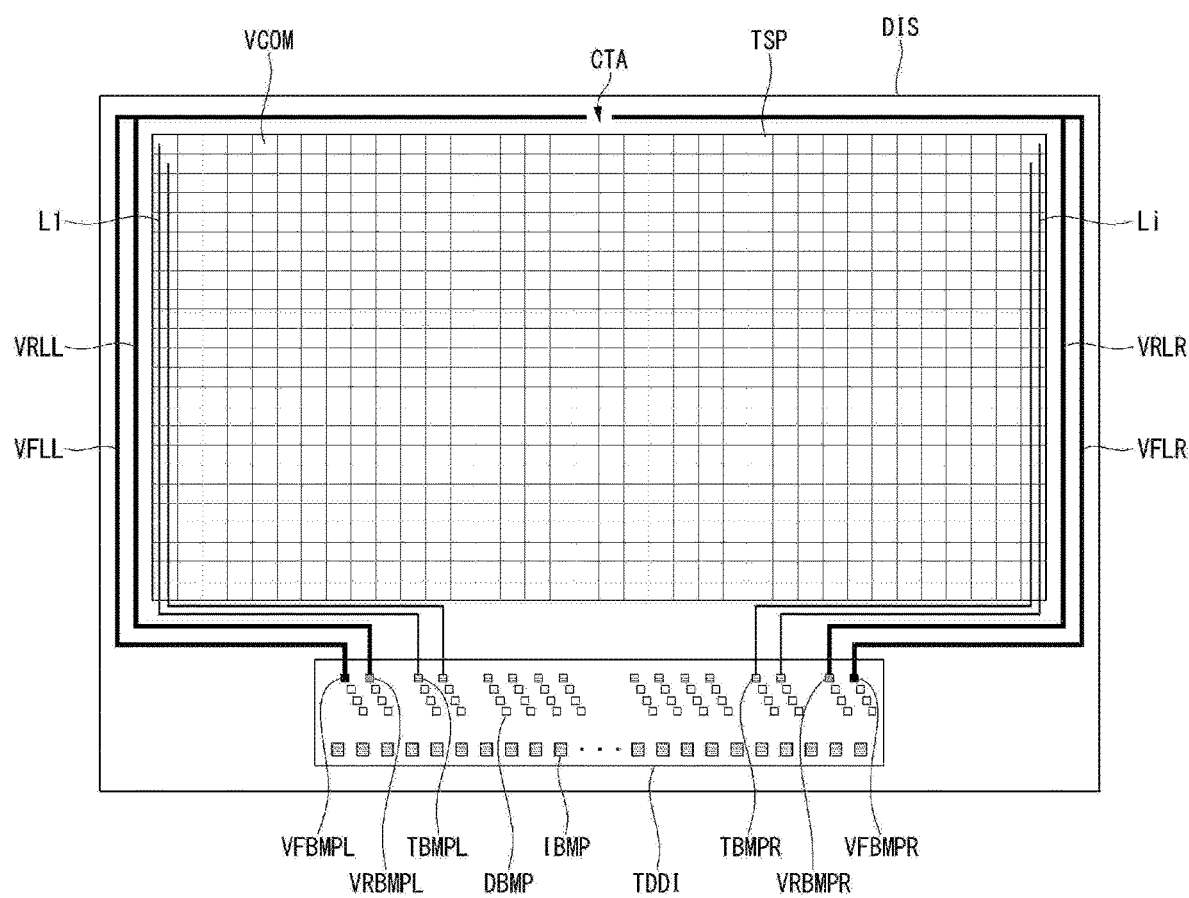
FIG. 8 is a diagram showing main components of a display device having a touch sensor according to an embodiment of the present disclosure.
Figure 9:
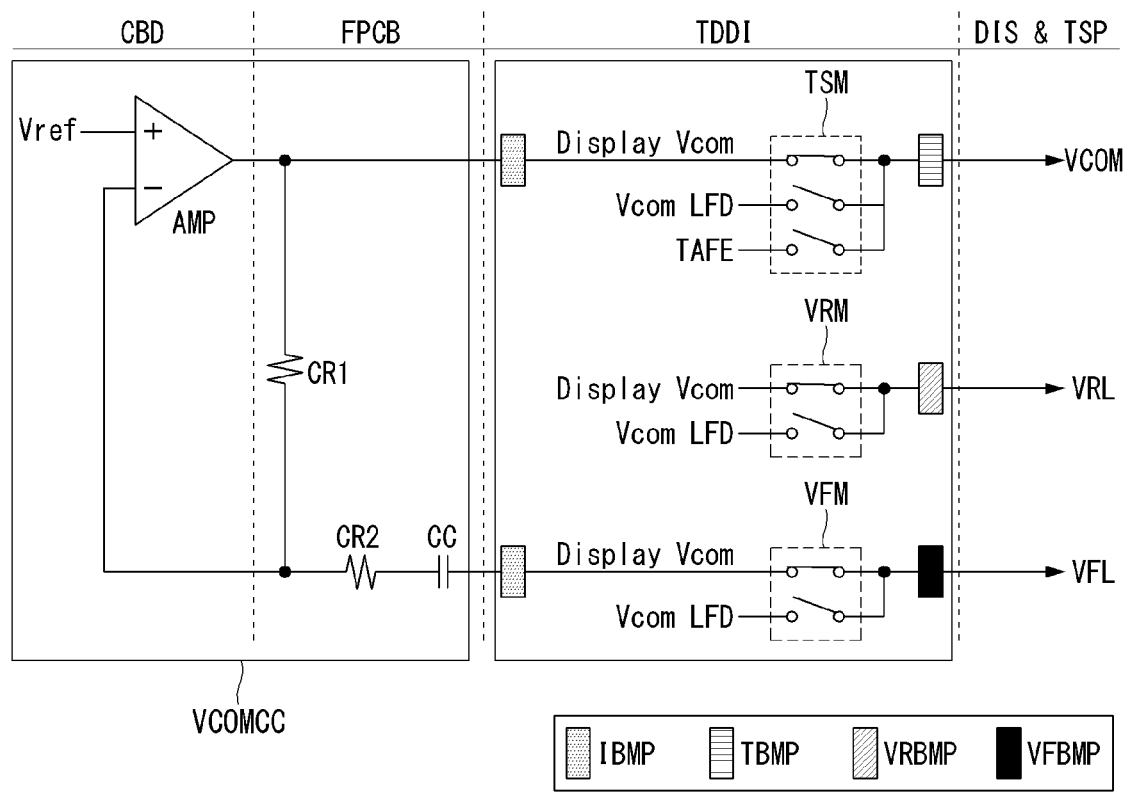
FIGS. 9 and 10 are diagrams for describing a configuration of an integrated driving circuit according to an embodiment of the present disclosure.
Figure 10:
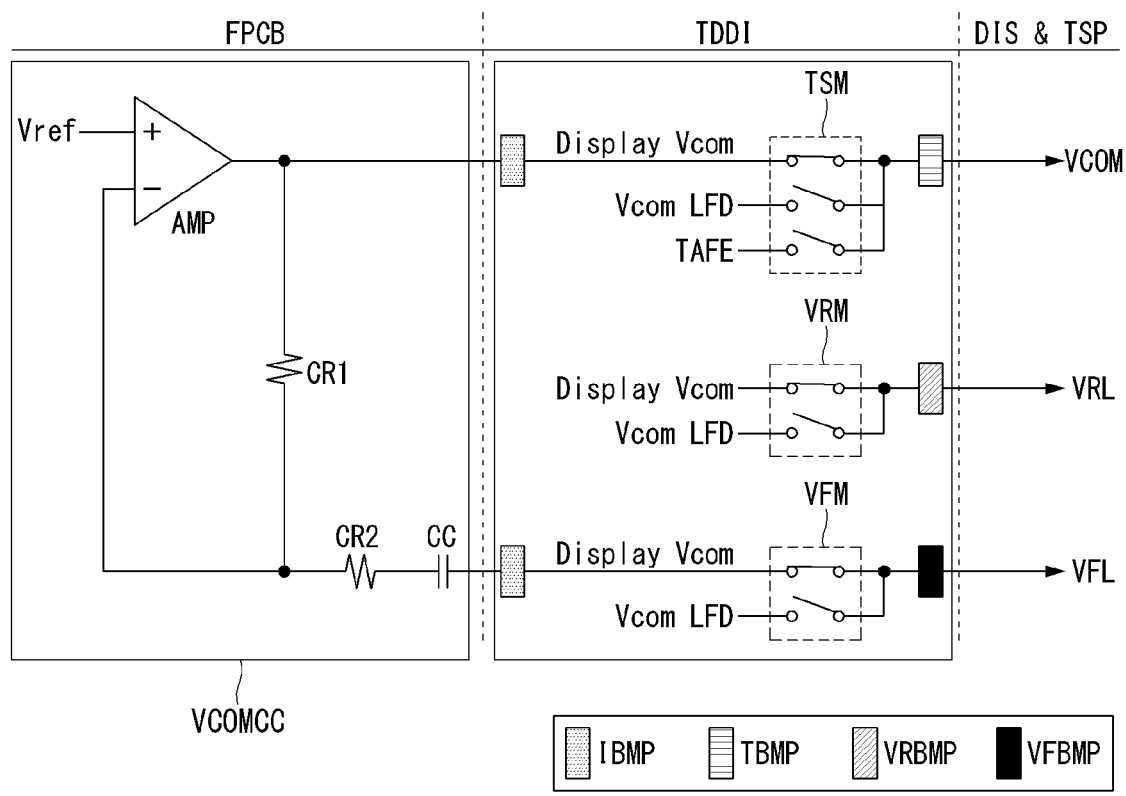
Figure 11:
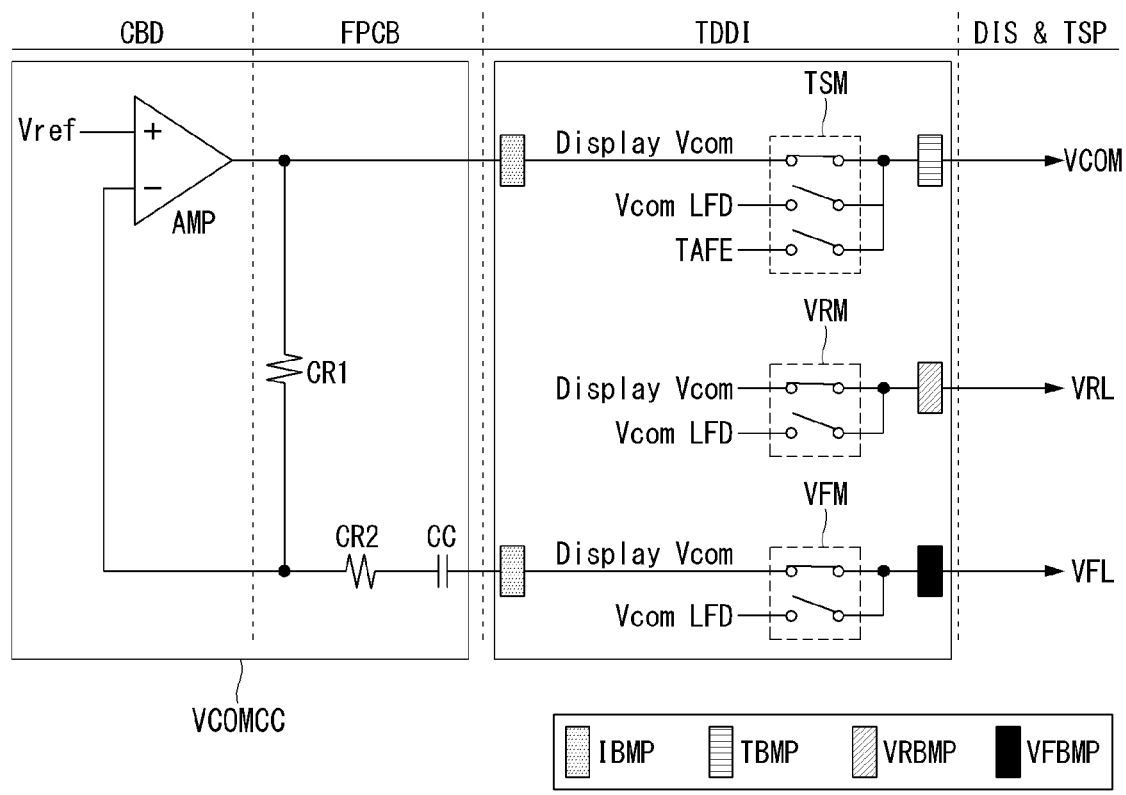
FIGS. 11 to 14 are diagrams for describing operating states and output states of the integrated driving circuit in respective periods according to one embodiment.
Figure 12:
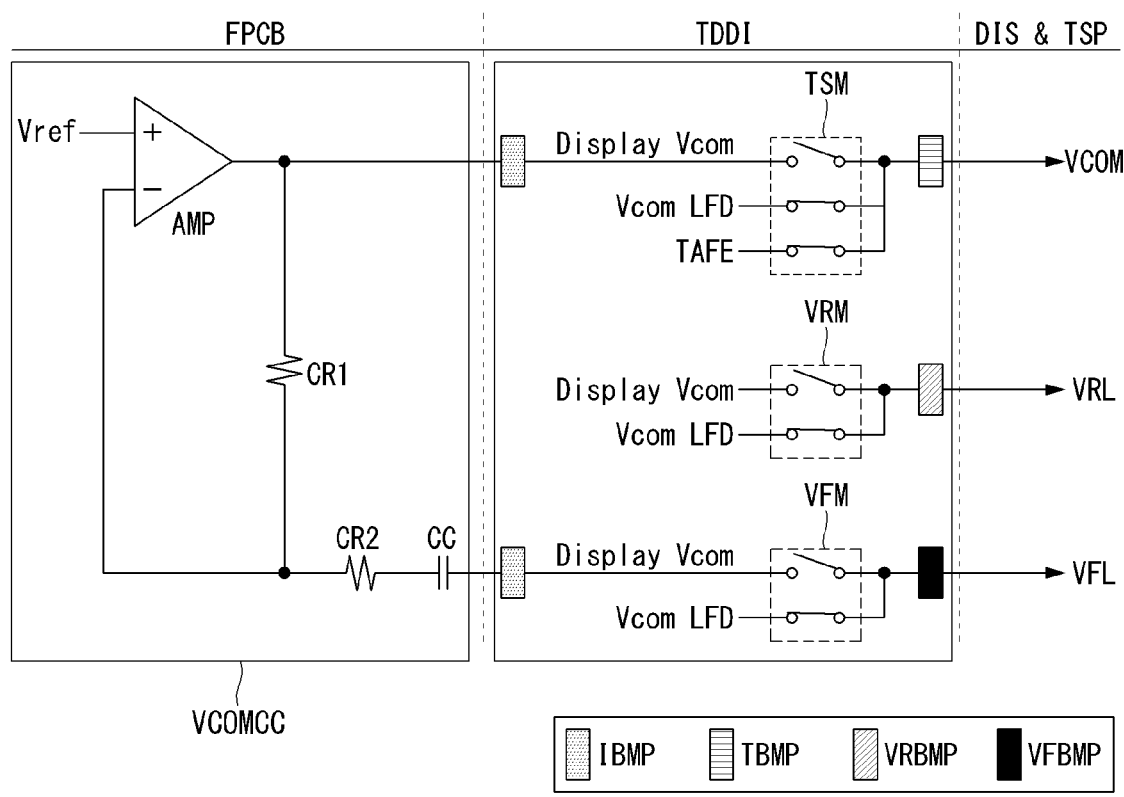

FIG. 8 is a diagram showing main components of a display device having a touch sensor according to an embodiment of the present invention and FIGS. 9 and 10 are diagrams for describing a configuration of an integrated driving circuit according to an embodiment of the present disclosure.

As shown in FIG. 8, the display device having a touch sensor according to an embodiment of the present disclosure includes a liquid crystal display panel DIS having a touchscreen TSP and an integrated driving circuit TDDI for driving the liquid crystal display panel DIS. Although an integrated driving circuit TDDI configured in the form of an IC on the liquid crystal display panel DIS is exemplified, the present invention is not limited thereto.

Since the touchscreen TSP is composed of common electrodes VCOM included in subpixels, an area in which the common electrodes VCOM are formed corresponds to a display area of the liquid crystal display panel DIS and an area in which the integrated driving circuit TDDI, common voltage ring lines VRLL and VRLR and common voltage feedback lines VFLL and VFLR are formed corresponds to a non-display area of the liquid crystal display panel DIS.

The integrated driving circuit TDDI includes touch pads TBMPL and TBMPR, common voltage ring pads VRBMPL and VRBMPR, common voltage feedback pads VFBMPL and VFBMPR, display pads DBMP, and input pads IBMP.

The input pads IBMP may be arranged in a line in the horizontal direction. The input pads IBMP are pads for signal input on the side of an input terminal connected to an external device. The touch pads TBMPL and TBMPR, the common voltage pads VRBMPL and VRBMPR, the common voltage feedback pads VFBMPL and VFBMPR, and the display pads DBMP may be arranged in a diagonal direction distinguished from the input pads IBMP. The touch pads TBMPL and TBMPR, the common voltage pads VRBMPL and VRBMPR, the common voltage feedback pads VFBMPL and VFBMPR, and the display pads DBMP are pads for signal output and feedback on the side of an output terminal connected to electrodes or lines arranged on the liquid crystal display panel DIS.

The common voltage feedback pads VFBMPL and VFBMPR may be respectively disposed at the leftmost side and the rightmost side of the integrated driving circuit TDDI. The common voltage feedback pads VFBMPL and VFBMPR may include a left common voltage feedback pads VFBMPL and a right common voltage feedback pads VFBMPR.

The left common voltage feedback pads VFBMPL may be connected to a left common voltage feedback line VFLL. The left common voltage feedback line VFLL may be arranged in two areas including the lower non-display area and the left non-display area of the liquid crystal display panel DIS. The left common voltage feedback line VFLL may be electrically connected to a left common voltage ring line VRLL in the upper non-display area of the liquid crystal display panel DIS far away from the integrated driving circuit TDDI.

The right common voltage feedback pads VFBMPR may be connected to a right common voltage feedback line VFLR. The right common voltage feedback line VFLR may be arranged in two areas including the lower non-display area and the right non-display area of the liquid crystal display panel DIS. The right common voltage feedback line VFLR may be electrically connected to a right common voltage ring line VRLR in the upper non-display area of the liquid crystal display panel DIS far away from the integrated driving circuit TDDI.

The common voltage ring pads VRBMPL and VRBMPR may be respectively arranged on the left and right sides of the integrated driving circuit TDDI. The common voltage ring pads VRBMPL and VRBMPR may include a left common voltage ring pads VRBMPL in proximity to the left common voltage feedback pads VFBMPL and a right common voltage ring pads VRBMPR in proximity to the right common voltage feedback pads VFBMPR.

The left common voltage ring pads VRBMPL may be connected to the left common voltage ring line VRLL. The left common voltage ring line VRLL may be arranged in three areas including the lower non-display area, the left non-display area and the upper non-display area of the liquid crystal display panel DIS. The right common voltage ring pads VRBMPR may be connected to the right common voltage ring line VRLR. The right common voltage ring line VRLR may be arranged in three areas including the lower non-display area, the right non-display area and the upper non-display area of the liquid crystal display panel DIS.

The left common voltage ring line VRLL may be disposed inside the left common voltage feedback line VFLL and the right common voltage ring line VRLR may be disposed inside the right common voltage feedback line VFLR.

However, the left common voltage ring line VRLL and the right common voltage ring line VRLR are in a cut (disconnected) state as represented by "CTA" without being electrically connected to each other in the upper non-display area of the liquid crystal display panel DIS. That is, the left common voltage ring line VRLL and the right common voltage ring line VRLR are arranged in a form surrounding the touchscreen TSP while being open in the upper non-display area. When the left common voltage ring line VRLL and the right common voltage ring line VRLR are disconnected from each other in the upper non-display area of the liquid crystal display panel DIS in this manner, a problem that a noise component generated in a side of the liquid crystal display panel DIS is amplified (noise amplification) can be solved.

A plurality of touch pads TBMPL and TBMPR may be arranged between the left common voltage ring line VRLL and the right common voltage ring line VRLR of the integrated driving circuit TDDI. The touch pads TBMPL and TBMPR may be connected to the common voltages VCOM of the touchscreen TSP through the sensing lines L1 to Li. The sensing lines L1 to Li may be arranged to extend to the inside of the liquid crystal display panel DIS distinguished from other lines.

A plurality of display pads DBMP may be arranged in a space between the input bumps IBMP on the input terminal, and the touch pads TBMPL and TBMPR, the common voltage ring pads VRBMPL and VRBMPR and the common voltage feedback pads VFBMPL and VFBMPR included in the integrated driving circuit TDDI. The display pads DBMP may be arranged in a diagonal direction.

As shown in FIGS. 9 and 10, the integrated driving circuit TDDI drives the touchscreen TSP and the liquid crystal display panel DIS in association with a common voltage compensation circuit VCOMCC. The common voltage compensation circuit VCOMCC may include an amplifier AMP, a first resistor CR1, a second resistor CR2, and a capacitor CC. The common voltage compensation circuit VCOMCC can compensate for a common voltage to be output through the touch pads TBMP on the basis of a common voltage fed back through the common voltage feedback pads VFBMP of the integrated driving circuit TDDI.

A non-inverting terminal (+) of the amplifier AMP may be connected to a reference voltage terminal Vref, an inverting terminal (−) thereof may be connected to a node to which one end of the first resistor CR1 and one end of the second resistor CR2 are connected, and an output terminal thereof may be connected to the other end of the first resistor CR1 and an input pad IBMP (upper input pad in FIGS. 9 and 10) of the integrated driving circuit TDDI. One end of the capacitor CC may be connected to the other end of the second resistor CR2 and the other end thereof may be connected to another input pad IBMP (lower input pad in FIGS. 9 and 10) of the integrated driving circuit TDDI.

As shown in FIG. 9, the amplifier AMP of the common voltage compensation circuit VCOMCC may be positioned on a control board CBD and the first resistor CR1, the second resistor CR2 and the capacitor CC may be positioned on a printed circuit board FPCB. Alternatively, the amplifier AMP, the first resistor CR1, the second resistor CR2 and the capacitor CC of the common voltage compensation circuit VCOMCC may be positioned on a printed circuit board FPCB, as shown in FIG. 10. However, FIGS. 9 and 10 are merely examples, and the present disclosure is not limited thereto and the amplifier AMP, the first resistor CR1, the second resistor CR2 and the capacitor CC of the common voltage compensation circuit VCOMCC may be arranged in various manners according to device configuration.

The integrated driving circuit TDDI may include a first selector TSM, a second selector VRM and a third selector VFM. The first selector TSM, the second selector VRM and the third selector VFM may be implemented as multiplexers, switches or the like which can output one or more voltages or signals through a single output terminal in a time division manner. The first selector TSM, the second selector VRM and the third selector VFM can selectively control output of voltages or signals on the basis of a display & touch control signal applied to internal components of the integrated driving circuit TDDI.

The first selector TSM can serve to output one selected from a display common voltage Display Vcom, a load-free common voltage Vcom LFD, and a touch driving signal TAFE through a touch pad TBMP. The load-free common voltage Vcom LFD can be defined as a signal (a data signal, a gate signal or a common voltage) having the same voltage or phase as that of the touch driving signal TAFE for load free driving (LFD) for reducing a load of the liquid crystal display panel DIS (or reducing a parasitic capacitance). Meanwhile, the first selector TSM may output a compensated display common voltage as well as the display common voltage Display Vcom on the basis of a feedback common voltage transmitted according to operation of the third selector VFM.

The second selector VRM can serve to output one selected from the display common voltage Display Vcom and the load-free common voltage Vcom LFD through a common voltage ring pad VRBMP. The third selector VFM can serve to receive feedback of a common voltage applied to the liquid crystal display panel DIS or output the load-free common voltage Vcom LFD through a common voltage feedback pad VFBMP.

Figure 15:
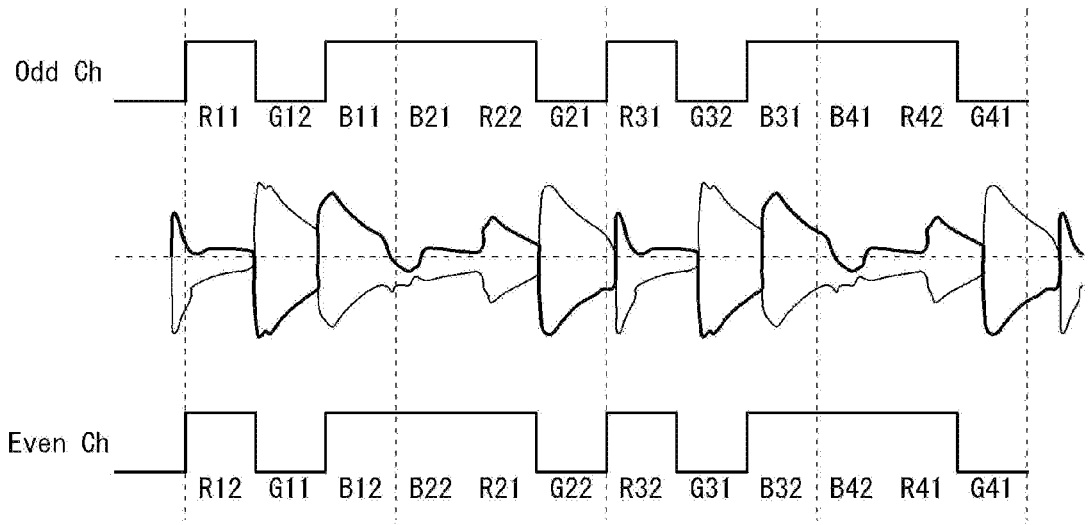
FIG. 15 shows a simulation result of a liquid crystal display integrated with a touchscreen according to a test example according to one embodiment.
Figure 16:
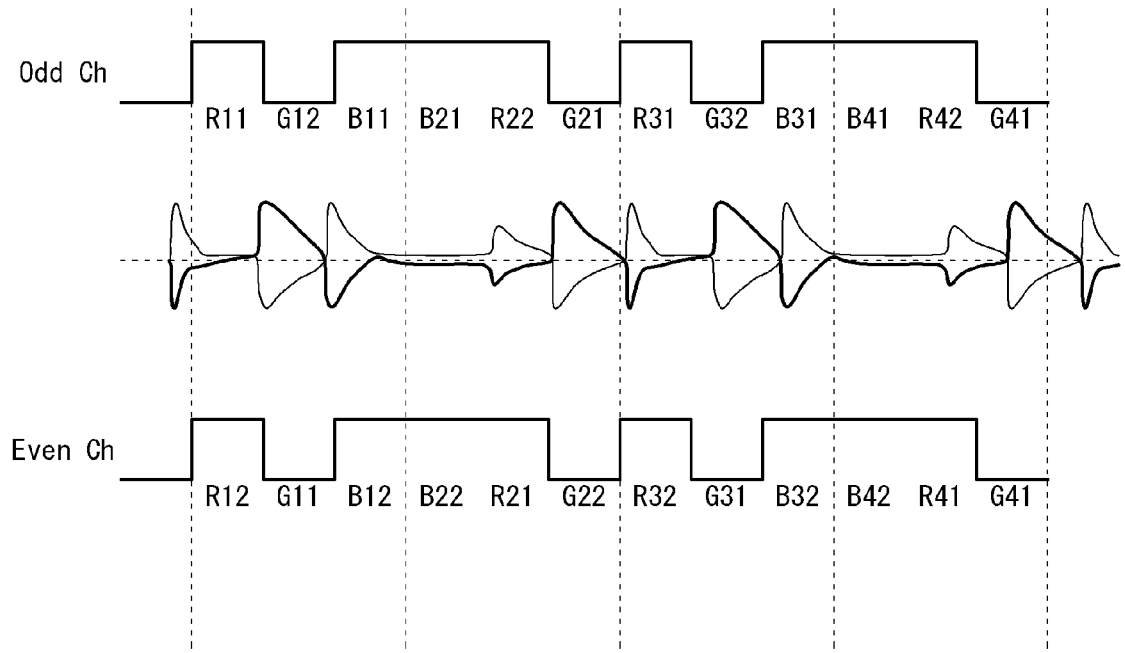
FIG. 16 shows a simulation result of the liquid crystal display integrated with the touchscreen according to an embodiment.

FIGS. 11 to 14 are diagrams for describing operating states and output states of the integrated driving circuit in respective periods and FIGS. 15 and 16 show simulation results for describing the effects of the display device having a touch sensor according to an embodiment of the present invention.

As shown in FIGS. 11 to 14, the first to third selectors TSM, VRM and VFM of the integrated driving circuit TDDI according to the embodiment can perform different operations in a display driving period Td in which an image is displayed on the liquid crystal display panel DIS and a touchscreen driving period Tt in which the touchscreen TSP is sensed.

The first selector TSM operates to output the display common voltage Display Vcom through a touch pad TBMP in the display driving period Td and operates to output the load-free common voltage Vcom LFD and the touch driving signal TAFE in a time division manner in the touchscreen driving period Tt.

The second selector VRM operates to output the display common voltage Display Vcom through a common voltage ring pad VRBMP in the display driving period Td and operates to output the load-free common voltage Vcom LFD in the touchscreen driving period Tt.

The third selector VFM operates to receive feedback of a common voltage applied to the liquid crystal display panel DIS through a common voltage feedback pad VFBMP in the display driving period Td and operates to output the load-free common voltage Vcom LFD in the touchscreen driving period Tt.

Figures 13, 14:
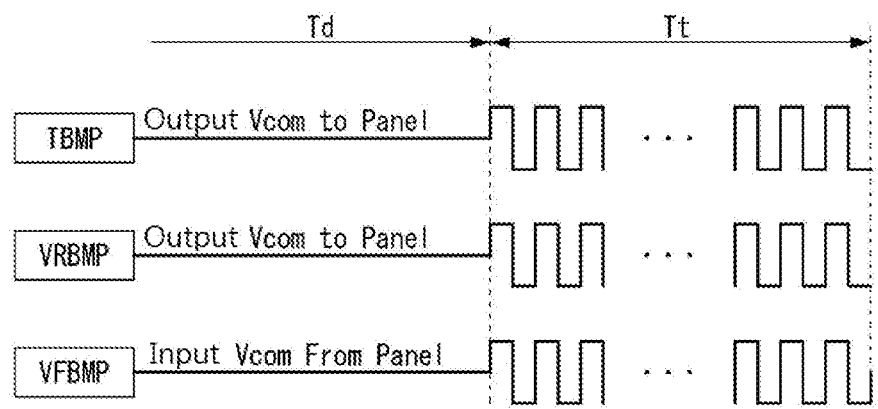

As can be ascertained from FIGS. 13 and 14, the display common voltage Display Vcom output from the touch pad TBMP and the common voltage ring pad VRBMP of the integrated driving circuit TDDI in the display driving period Td and the load-free common voltage Vcom LFD output from the touch pad TBMP and the common voltage ring pad VRBMP of the integrated driving circuit TDDI in the touchscreen driving period Tt have different characteristics.

The display common voltage Display Vcom is fixed to a DC (Direct Current) form having a specific voltage level, whereas the load-free common voltage Vcom LFD has a pulse form in which high and low voltage levels alternate. In addition, the frequency or width of pulses constituting the load-free common voltage Vcom LFD may vary according to load.

According to the present disclosure, the touch driving signal TAFE and the load-free common voltage Vcom LFD can be applied to common electrodes serving as a touch sensor of the touchscreen for the touchscreen driving period Tt on the basis of the above-described components. In addition, touch sensitivity in the peripheral part of the liquid crystal display panel can be enhanced or improved by applying the load-free common voltage Vcom LFD through the additionally configured common voltage ring pads VRBMP.

Furthermore, according to the present disclosure, the common voltage applied to the common electrodes serving as electrodes of the liquid crystal display panel can be fed back for the display driving period Td on the basis of the above-described components. In addition, it is possible to compensate for ripples in response to a degree of coupling of the display common voltage Display Vcom on the basis of the feedback common voltage to enhance or improve the definition of the liquid crystal display panel.

Accordingly, the present disclosure has the effect of coping with generation of a pattern vulnerable to common voltage ripples (color mixture and horizontal block dimming due to a pattern vulnerable to common voltage ripples) because the device can be driven on the basis of the integrated driving circuit TDDI that can separately use common voltage feedback lines and common voltage ring lines for driving periods.

FIG. 15 shows a simulation result of a liquid crystal display integrated with a touchscreen according to a test example, and FIG. 16 shows a simulation result of the liquid crystal display integrated with the touchscreen according to an embodiment. The simulation result of the test example was obtained under the condition that a compensation operation through the common voltage ring pad VRBMP and the common voltage feedback pad VFBMP was not performed (compensation operation was skipped) and the simulation result of the embodiment was obtained under the condition that the compensation operation through the common voltage ring pad VRBMP and the common voltage feedback pad VFBMP was performed.

As shown in FIGS. 15 and 16, transition of all outputs (odd and even channels) in the same frame occurs in the same direction (rising/falling) in the liquid crystal display integrated with the touchscreen.

Accordingly, when a compensation operation through the common voltage ring pad VRBMP and the common voltage feedback pad VFBMP is limited (not performed) as in the test example of FIG. 15, it is difficult to compensate for or mitigate the influence of switch noise on a common voltage and thus ripple noise may be generated. A peak level of the ripple noise is not stabilized for a short time such as 1 horizontal time (1H) in general. Accordingly, when the peak level of the ripple noise is high as in the test example, color mixture may occur in the liquid crystal display panel. This phenomenon is intensified for a display device having shorter 1 horizontal time (1H), higher resolution and larger size (for reference, the aforementioned problem is barely recognized because load is insignificant at low resolution).

However, when the compensation operation through the common voltage ring pad VRBMP and the common voltage feedback pad VFBMP is performed as in the embodiment of FIG. 16, it is possible to compensate for or mitigate the influence of switch noise on the common voltage and thus occurrence of ripple noise can be minimized. Accordingly, when a peak level of ripple noise is low even though the ripple noise is generated as in the embodiment, stabilization can be performed relatively rapidly in a limited condition of short time such as 1 horizontal time (1H). Consequently, the embodiment can prevent or improve color mixture in the liquid crystal display panel.

Therefore, as can be ascertained through comparison of FIG. 15 with FIG. 16, the liquid crystal display integrated with the touchscreen according to the embodiment can perform a compensation operation by separately using a common voltage feedback line and a common voltage ring line for respective driving periods and thus can reduce or improve problems that can be caused in the test example.

Figure 17:
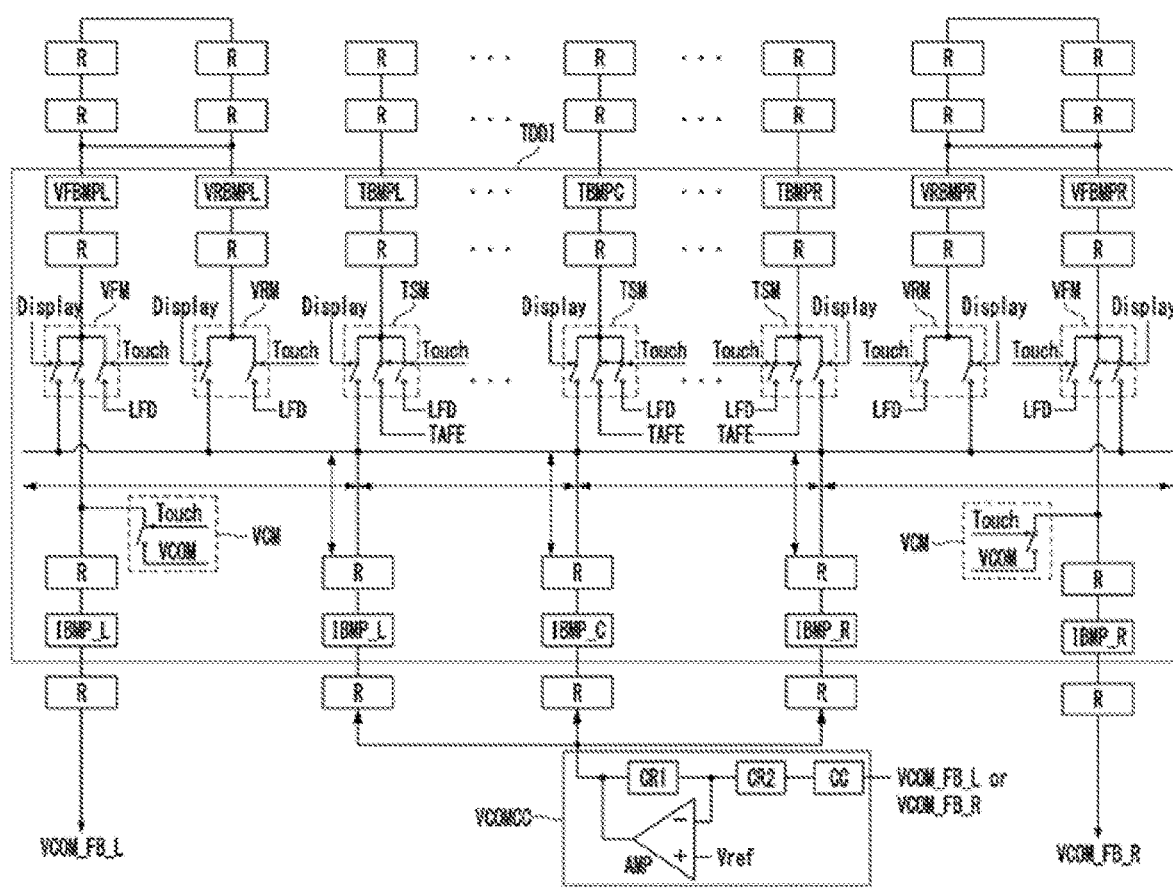
FIG. 17 shows internal and external circuit configurations of an integrated driving circuit according to an embodiment of the present disclosure.

FIG. 17 shows internal and external circuit configurations of an integrated driving circuit according to an embodiment of the present invention.

As shown in FIG. 17, the integrated driving circuit TDDI according to an embodiment of the present embodiment may include input pads IBMP_L, IBMP_C and IBMP_R, output pads VFBMPL, VRBMPL, TBMPL, TBMPC, TBMPR, VRBMPL and VFBMPR, selectors VFM, VRM and TSM, and a common voltage application part VCM. Illustration of a plurality of display pads arranged in a diagonal direction is omitted in FIG. 17. In addition, "R" represents line resistance present on lines related to the input pads IBMP_L, IBMP_C and IBMP_R, the output pads VFBMPL, VRBMPL, TBMPL, TBMPC, TBMPR, VRBMPL and VFBMPR, and the selectors VFM, VRM and TSM.

The output pads VFBMPL, VRBMPL, TBMPL, TBMPC, TBMPR, VRBMPL and VFBMPR may be arranged in a line in proximity to the display area of the liquid crystal display panel. The output pads VFBMPL, VRBMPL, TBMPL, TBMPC, TBMPR, VRBMPL and VFBMPR may include common voltage feedback pads VFBMPL and VFBMPR, common voltage ring pads VRBMPL and VRBMPR, and touch pads TBMPL, TBMPC and TBMPR.

The common voltage feedback pads VFBMPL and VFBMPR may be respectively disposed at the leftmost side and the rightmost side of the integrated driving circuit TDDI. The common voltage feedback pads VFBMPL and VFBMPR may include a left common voltage feedback pad VFBMPL and a right common voltage feedback pad VFBMPR.

The common voltage ring pads VRBMPL and VRBMPR may be respectively arranged on the left and right sides of the integrated driving circuit TDDI. The common voltage ring pads VRBMPL and VRBMPR may include a left common voltage ring pad VRBMPL in proximity to the left common voltage feedback pad VFBMPL and a right common voltage ring pad VRBMPR in proximity to the right common voltage feedback pad VFBMPR.

A plurality of touch pads TBMPL, TBMPC and TBMPR may be arranged between the common voltage ring pads VRBMPL and VRBMPR. The touch pads TBMPL, TBMPC and TBMPR may be defined as a left touch pad TBMPL, a center touch pad TBMPC and a right touch pad TBMPR according to the position of the integrated driving circuit TDDI.

The input pads IBMP_L, IBMP_C and IBMP_R may be arranged in a line in the horizontal direction in proximity to the edge area of the liquid crystal display panel. The input pads IBMP_L, IBMP_C and IBMP_R may be defined as a left input pad IBMP_L, a center input pad IBMP_C and a right input pad IBMP_R according to the position of the integrated driving circuit TDDI.

A common voltage compensation circuit may include an amplifier AMP, a first resistor CR1, a second resistor CR2, and a capacitor CC. The common voltage compensation circuit VCOMCC may be connected to the input pads IBMP_L, IBMP_C and IBMP_R. The left input pad IBMP_L and the right input pad IBMP_R respectively relate to the left common voltage feedback pad VFBMPL and the right common voltage feedback pad VFBMPR. Accordingly, one end of the capacitor CC can be connected to the left input pad IBMP_L and the right input pad IBMP_R. To uniformly compensate for a common voltage to be applied to the liquid crystal display panel on the basis of a feedback common voltage, the common voltage compensation circuit VCOMCC can be connected such that the compensated common voltage is applied to the left input pad IBMP_L, the center input pad IBMP_C and the right input pad IBMP_R.

The common voltage application part VCM can serve to apply the common voltage to be applied to the liquid crystal display panel. The common voltage application part VCM may be implemented such that it generates and outputs a common voltage or may transmit a common voltage applied from the outside. The common voltage application part VCM may be positioned on a line connected to the left input pad IBMP_L and a line connected to the right input pad IBMP_R, but the present disclosure is not limited thereto.

The selectors VFM, VRM and TSM may include first selectors TSM, second selectors VRM and third selectors VFM. The first selectors TSM, the second selectors VRM and the third selectors VFM may be implemented as multiplexers, switches or the like which can output one or more voltages or signals through a single output terminal in a time division manner. The first selectors TSM, the second selectors VRM and the third selectors VFM may perform selective operations on the basis of a display & touch control signal applied to internal components of the integrated driving circuit TDDI.

The first selectors TSM can serve to output one selected from a display common voltage Display Vcom, a load-free common voltage LFD and a touch driving signal TAFE through the touch pads TBMPL, TBMPC and TBMPR. For example, the first selectors TSM may be implemented as MUXs having 3 inputs and 1 output. The load-free common voltage LFD can be defined as a signal (a data signal, a gate signal or a common voltage) having the same voltage or phase as that of the touch driving signal TAFE for load free driving for reducing a load of the liquid crystal display panel DIS (or reducing a parasitic capacitance). Meanwhile, the first selectors TSM may output a compensated display common voltage as well as the display common voltage Display Vcom on the basis of a feedback common voltage transmitted according to operations of the third selectors VFM.

The second selectors VRM can serve to output one selected from the display common voltage Display Vcom and the load-free common voltage LFD through the common voltage ring pads VRBMPL and VRBMPR. For example, the second selectors VRM may be implemented as MUXs having 2 inputs and 1 output. The third selectors VFM can serve to output a common voltage, or receive feedback of a common voltage applied to the liquid crystal display panel or output the load-free common voltage LFD through the common voltage feedback pads VFBMPL and VFBMPR. For example, the third selectors VFM may be implemented as MUXs having 3 inputs and 1 output.

As described above, the present disclosure can provide a display device having a touch sensor which can enhance or improve touch sensitivity in a peripheral part of a display panel and compensate for voltage ripples on the basis of a feedback common voltage received from the display panel to enhance or improve definition. Furthermore, the present invention can cope with generation of a pattern vulnerable to voltage ripples (color mixture and horizontal block dimming) on the display panel.

What is claimed is:

1. A display device having a touch sensor, comprising:
a display panel having a touchscreen;
an integrated driving circuit outputting a touch driving signal and a display common voltage for respectively driving the touchscreen and the display panel;
a common voltage ring line disposed in the display panel and connected to a common voltage ring pad of the integrated driving circuit;
a common voltage feedback line disposed in the display panel, connected to a common voltage feedback pad of the integrated driving circuit and connected to the common voltage ring line in an area far away from the integrated driving circuit;
a common voltage compensation circuit connected to an input pad of the integrated driving circuit, the common voltage compensation circuit configured to compensate for the display common voltage to be applied to the display panel on a basis of a feedback common voltage transmitted through the common voltage feedback line,
wherein the integrated driving circuit outputs the display common voltage through the common voltage ring pad in a period in which the display panel is driven and outputs a load-free common voltage having a form different from that of the display common voltage through the common voltage ring pad in a period in which the touchscreen is driven,
wherein the integrated driving circuit includes:
a first selector configured to output one selected from the display common voltage, the load-free common voltage, and the touch driving signal through touch pads connected to the display panel having the touchscreen;
a second selector configured to output one selected from the display common voltage and the load-free common voltage through the common voltage ring pad; and
a third selector configured to receive the feedback common voltage or outputting the load-free common voltage through the common voltage feedback pad.

2. The display device having a touch sensor of claim 1, wherein the display common voltage has a direct current form and the load-free common voltage has a pulse form.

3. The display device having a touch sensor of claim 1, wherein the integrated driving circuit receives the feedback common voltage through the common voltage feedback pad in the period in which the display panel is driven and outputs the load-free common voltage through the common voltage feedback pad in the period in which the touchscreen is driven.

4. The display device having a touch sensor of claim 1, wherein the common voltage ring line has a disconnected open region while surrounding all sides of the touchscreen positioned on the display panel.

5. The display device having a touch sensor of claim 4, wherein the open region is positioned in an upper non-display area of the display panel opposite a lower non-display area of the display panel to which the integrated driving circuit is attached.

6. The display device having a touch sensor of claim 1, wherein the first to third selectors perform selective operations on the basis of a signal defining the period in which the display panel is driven and the period in which the touchscreen is driven.

7. The display device having a touch sensor of claim 6, wherein the first to third selectors are implemented as multiplexers or switches which output one or more voltages or signals through a single output terminal in a time division manner.

8. A method of driving a display device having a touch sensor, including an integrated driving circuit outputting a touch driving signal and a display common voltage for respectively driving a touchscreen and a display panel, a common voltage ring line disposed in the display panel and connected to a common voltage ring pad of the integrated driving circuit, and a common voltage feedback line disposed in the display panel, connected to a common voltage feedback pad of the integrated driving circuit and connected to the common voltage ring line in an area far away from the integrated driving circuit, and a common voltage compensation circuit connected to an input pad of the integrated driving circuit and configured to compensate for the display common voltage to be applied to the display panel on a basis of a feedback common voltage transmitted through the common voltage feedback line, the method comprising:
a display panel driving step of outputting the display common voltage through the common voltage ring pad in a period in which the display panel is driven; and
a touchscreen driving step of outputting a load-free common voltage having a form different from that of the display common voltage through the common voltage ring pad in a period in which the touchscreen is driven, wherein the integrated driving circuit includes:
a first selector configured to output one selected from the display common voltage, the load-free common voltage, and the touch driving signal through touch pads connected to the display panel having the touchscreen;
a second selector configured to output one selected from the display common voltage and the load-free common voltage through the common voltage ring pad; and
a third selector configured to receive the feedback common voltage or outputting the load-free common voltage through the common voltage feedback pad.

9. The method of claim 8, wherein the display panel driving step further comprises a step of receiving a feedback common voltage through the common voltage feedback pad and compensating for the display common voltage to be displayed to the display panel on a basis of the feedback common voltage, and the touchscreen driving step further comprises a step of outputting the load-free common voltage through the common voltage feedback pad.

10. The method of claim 8, wherein the display common voltage has a direct current form and the load-free common voltage has a pulse form.

11. The method of claim 8, wherein the common voltage ring line comprises a disconnected open region while surrounding all sides of the touchscreen positioned on the display panel.

12. The method of claim 11, wherein the open region is positioned in an upper non-display area of the display panel opposite a lower non-display area of the display panel to which the integrated driving circuit is attached.

13. The method of claim 8, further comprising:
performing, by the first to third selections, selective operations on a basis of a signal defining the period in which the display panel is driven and the period in which the touchscreen is driven.

14. The method of claim 13, wherein the first to third selectors comprise multiplexers or switches which output one or more voltages or signals through a single output terminal in a time division manner.

* * * * *